United States Patent [19]

Asada

[11] Patent Number: 5,140,870
[45] Date of Patent: Aug. 25, 1992

[54] SHIFT CONTROL SYSTEM AND METHOD FOR SELECTING ENGAGEMENT/DISENGAGEMENT PATTERNS WITHIN THE SAME SPEED STAGE

[75] Inventor: Toshiyuki Asada, Susono, Japan

[73] Assignee: Toyota Jidosha Kabushiki Kaisha, Toyota, Japan

[21] Appl. No.: 632,079

[22] Filed: Dec. 21, 1990

[30] Foreign Application Priority Data

Dec. 22, 1989 [JP] Japan ................................. 1-334475

[51] Int. Cl.⁵ ...................... F16H 59/70; F16H 61/04
[52] U.S. Cl. .................................. 74/866; 364/424.1; 475/276
[58] Field of Search ............. 475/269, 271, 272, 275, 475/276, 281, 284, 288, 289, 290, 291, 296, 297, 329, 330; 364/424.1; 74/866

[56] References Cited

U.S. PATENT DOCUMENTS

| | | | |
|---|---|---|---|
| 3,640,153 | 2/1972 | Kepner | 475/281 X |
| 3,678,785 | 7/1972 | Stahlberg | 475/281 |
| 3,863,524 | 2/1975 | Mori et al. | 475/281 X |
| 3,971,268 | 7/1976 | Murakami et al. | 475/276 |
| 3,999,448 | 12/1976 | Murakami et al. | 475/276 |
| 4,143,562 | 3/1979 | Murakami et al. | 475/276 |
| 4,233,861 | 11/1980 | Gaus et al. | 475/56 |
| 4,263,823 | 4/1981 | Numazawa | 475/269 X |
| 4,653,348 | 3/1987 | Hiraiwa | 475/276 |
| 4,660,439 | 4/1987 | Hiraiwa | 475/276 |
| 4,744,267 | 5/1988 | Lepelletier | 475/276 |
| 4,963,124 | 10/1990 | Takahashi et al. | 475/276 X |
| 4,984,485 | 1/1991 | Kojima et al. | 74/866 |
| 5,035,160 | 7/1991 | Morita | 74/866 |

Primary Examiner—Rodney H. Bonck
Assistant Examiner—Khoi Q. Ta
Attorney, Agent, or Firm—Oblon, Spivak, McClelland, Maier & Neustadt

[57] ABSTRACT

A shift control system for use in an automatic transmission which includes a plurality of frictional engagement components, and a gear train adapted to set a plurality of speed stage having (Tables 1 and 3) different gear ratios in accordance with the combination for engagement/release of the frictional engagement components and enabled to select a combination for engaging and releasing any of the frictional engagement components as that for engagement/release of the frictional engagement components for setting any of the speed stages. The shift control system includes a decider for deciding a shift to be executed; an engagement/release pattern selector for selecting a combination for engaging the frictional engagement components in a first combination (Table 3) for setting a predetermined one of the speed stages, before the shift is decided, and a second combination (Table 3) for the predetermined one of gear stages if the shift is decided; and an output device for outputting both an instruction signal for executing the shift and an instruction signal for setting the second combination (Table 1) of the frictional engagement components.

14 Claims, 4 Drawing Sheets

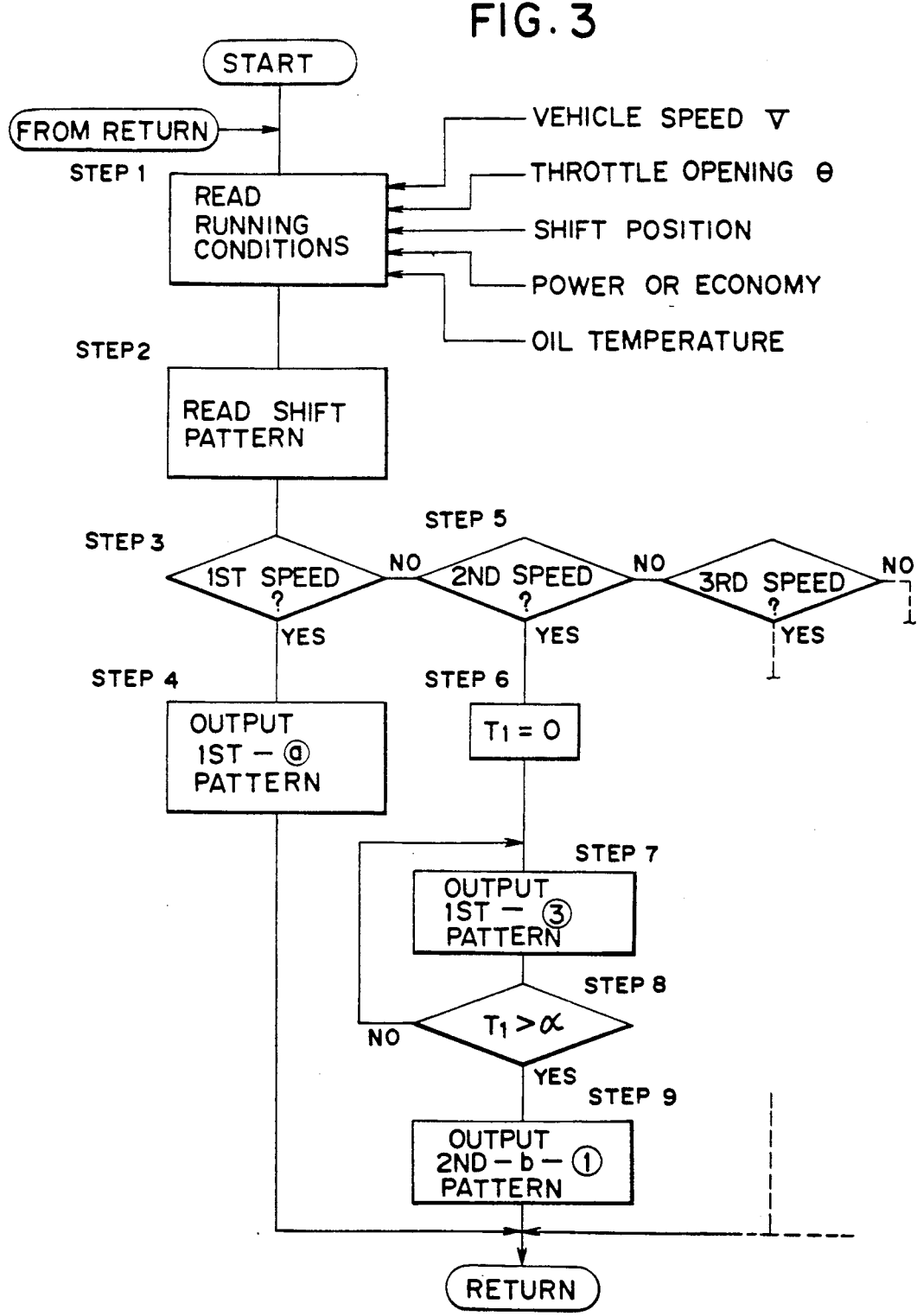

SHIFT CONTROL SYSTEM AND METHOD FOR SELECTING ENGAGEMENT/DISENGAGEMENT PATTERNS WITHIN THE SAME SPEED STAGE

BACKGROUND OF THE INVENTION

The present invention relates to an automatic transmission for use with vehicles and, more particularly, to a vehicular automatic transmission for setting a desired speed stages by engaging/releasing a plurality of frictional engagement means such as clutches in accordance with a plurality of kinds of combination patterns for engagement/release of the frictional engagement means.

A vehicular automatic transmission generally uses a plurality of planetary gear sets, each of which is composed of rotary components such as a sun gear, a ring gear and a carrier. The automatic transmission is constructed by connecting predetermined ones of the rotary components, by connecting any of the rotary components selectively to an input shaft by clutch means, by fixing another rotary component selectively by brake means, and by connecting an output shaft to still another rotary component. In the automatic transmission thus constructed, the number of speed stages to be set, the gear ratios at the individual speed stages, and the rotational speeds, loads or torques of the rotary components are varied in dependence upon the number of the planetary gear sets used, the manner how to connect the individual rotary components, and the number of and the manner how to dispose frictional engagement means such as the clutch means or the brake means, so that a remarkable variety of automatic transmissions can be constructed. All the structures could not be put into practical use, although they could be made in principle. It is not easy in the least to create a structure which can sufficiently meet the practical requirements such as feasible production, small size and low weight, ample shift controllability and excellent durability. For example, even an automatic transmission using three planetary gear sets to set forward five and reverse one speed stages might have an excessively large gear ratio for the reverse stage in dependence upon the manners how to arrange the frictional engagement means such as the clutches and how to adopt the gear ratio (i.e., the ratio of tooth numbers of the sun gears and the ring gears). For this automatic transmission, it would be necessary to increase the capacities of the frictional engagement means, thus raising a problem that the durabilities of the frictional engagement means and the bearings might be deteriorated. In order to solve this problem, as disclosed in Japanese Patent Laid-Open No. 60-57036, there is proposed an automatic transmission which is constructed to have a reverse gear ratio approximate to that for the forward 1st speed.

The structure of the automatic transmission according to this proposal will be briefly described in the following. This automatic transmission is composed mainly of three single pinion type planetary gear sets and is constructed by connecting the sun gear of the first planetary gear set and the sun gear of the second planetary gear set always or selectively, by connecting the sun gear of the first planetary gear set and the carrier of the second planetary gear set, if necessary, through a clutch, by connecting the ring gear of the second planetary gear set and the ring gear of the third planetary gear set, by connecting the carrier of the first planetary gear set with those ring gears, and by connecting the carrier of the second planetary gear set and the sun gear of the third planetary gear set through a clutch. The input shaft is connected through a clutch to the sun gears of the first and second planetary gear sets, which are connected to each other, and further to the ring gear of the first planetary gear set through another clutch. On the other hand, the output shaft is connected to the carrier of the third planetary gear set. As the brake means for stopping the rotation, moreover, there are provided a brake for fixing the sun gear of the first planetary gear set and the sun gear of the second planetary gear set and a brake for fixing the sun gear of the third planetary gear set. In the automatic transmission thus disclosed in Japanese Patent Laid-Open No. 60-57036, for the forward 1st speed, the rotations of the carrier of the second planetary gear set are blocked by engaging both the brake for fixing the sun gear of the third planetary gear set and the clutch for connecting the carrier of the second planetary gear set to that sun gear. For the reverse stage, too, the carrier of the second planetary gear set is fixed. And, the gear ratios at these forward 1st speed and reverse stage are given approximate values.

Incidentally, the structure, in which a one-way clutch is interposed between the carrier of the second planetary gear set and the casing, is shown in skeleton diagram in the aforementioned Japanese Patent Laid-Open No. 60-57036. However, this Laid-Open has failed to disclose the corresponding clutch and brake application chart and describe the speed stages to be set. Therefore, it is conceivable that the structure arranged with the additional one-way clutch sets the individual speed stages like other embodiments disclosed.

The automatic transmission thus disclosed in the prior art is enabled to set forward seven speeds and reverse one speed as a whole by adding 2.5th and 3.5th speeds to the main speed stages of forward five and reverse one speeds. However, the combination for engagement/release of the clutches and the brakes for setting each of the speed stages is only one. As a result, the frictional engagement means such as the clutches or brakes have to increase their capacities for setting any of the speed stages, if a torque to be applied to any of the frictional engagement means is high. In case, moreover, the speed stage is to be shifted from one to another, the fluctuating rotational speeds of the rotary components composing the gear train may become high depending upon the shifting manner. Since, however, the automatic transmission of the prior art has only one kind of combination pattern for engagement/release of the clutches or brakes, there is no specific method of reducing the fluctuating rotational speed for the shift. As a result, the automatic transmission of the prior art is accompanied by problems that the whole structure is enlarged by the large capacities of the clutches or brakes, that the shift shocks are deteriorated, and that a shift control has to be made difficult for avoiding the foregoing problems.

SUMMARY OF THE INVENTION

An object of the present invention is to reduce the torque to be applied to the frictional engagement means by making the combination of engagement/release of the frictional engagement means for setting a predetermined speed stage different for the shift and other operations.

Another object of the present invention is to reduce the size and lessen the weight of the automatic transmission.

According to the present invention, therefore, there is provided a shift control system for use in an automatic transmission, which comprises: decision means for deciding a shift to be executed; engagement/release pattern selecting means for selecting a first combination of the frictional engagement means for setting at least one of the speed stages, before the shift is decided, and a second combination for releasing the same frictional engagement means if the shift is decided; and output means for outputting both an instruction signal for executing the shift and an instruction signal for setting the combination for engagement/release of the selected one of the frictional engagement means.

The engagement/release pattern selecting means of the shift control system of the present invention is adapted to select such one of the combinations for engagement/release of said frictional engagement means that the number of frictional engagement means to have their engagement/release states switched at the time of the shift execution is two or less.

The output means of the shift control system of the present invention comprises a timer for counting the predetermined time period from the instant when the second combination is outputted to the instant the instruction signal for the shift execution is outputted.

According to the present invention, there is further provided a shift control method which comprises: a first step of deciding a shift to be executed from at least one of said speed stages; a second step of selecting a first combination for any of said frictional engagement means for engagement/release of said frictional engagement means for setting at least one of said speed stages, before the shift is decided, and a second combination for setting said at least one of said speed stages if the shift is decided; a third step of changing said first combination to said second combination in case the shift to be executed is decided; and a fourth step of executing the shift after said second combination has been set.

The above and further objects and novel features of the present invention will more fully appear from the following detailed description when the same is read in connection with the accompanying drawings. It is to be expressly understood, however, that the drawings are for the purpose of illustrations and are not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a flow chart showing an example of the control procedures in the automatic transmission shown in FIG. 2;

DETAILED DESCRIPTION OF THE PREFERRED EMBODIMENTS

Figure 1:
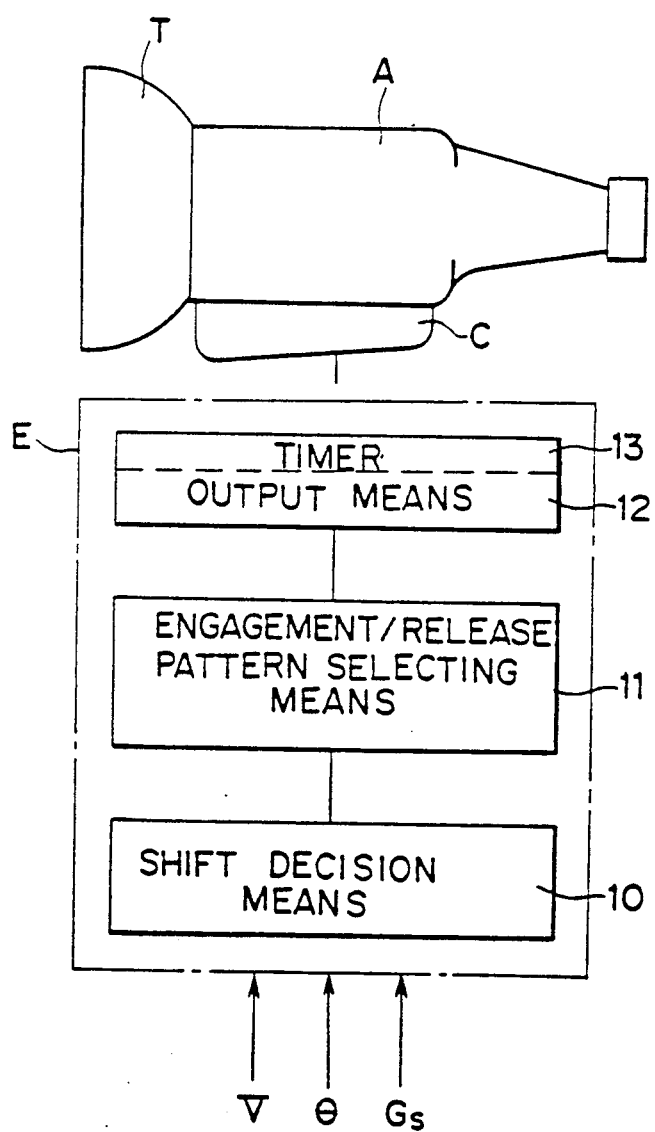
FIG. 1 is a block diagram showing the gist of the present invention.

As shown in FIG. 1, an automatic transmission A is connected through a torque converter T to the engine (although not shown) and is equipped with a gear train and frictional engagement means, as will be described hereinafter. Moreover, this automatic transmission A is set to a plurality of speed stages by engaging or releasing the frictional engagement means with an oil pressure fed from a hydraulic control circuit C.

This hydraulic control circuit C has a plurality of solenoid valves (although not shown), which are to be turned on or off in response to signals outputted from an electronic control unit E. This control unit E is constructed mainly of a microcomputer, which is made receptive of control data including a vehicle speed V, a throttle opening $\theta$ and a speed stage Gs in the present state, and is equipped shift decision means 10, engagement/release pattern selecting means 11 and output means 12.

The shift decision means 10 decides a shift to be executed, when a running state determined by the vehicle speed V and the throttle opening $\theta$ exceeds a predetermined shift point. On the other hand, the engagement/release pattern selecting means 11 selects a combination (as will be referred to as the "engagement/release pattern") for engagement/release of the frictional engagement means for setting a speed stage on the basis of the running state. In case there is an engagement/release pattern in which any of the frictional engagement means may be released or engaged, the engagement/release selecting means 11 selects the engagement/release for engaging said any of the frictional engagement means, in the absence of the shift decision, and the engagement/release pattern for releasing the same engagement/release, if necessary, in the presence of the shift decision. These selections of the engagement/release patterns are possible because the gear train of the automatic transmission A is constructed to have a plurality of kinds of engagement/release patterns for setting a predetermined speed stage, as will be described hereinafter. On the other hand, the output means 12 outputs both an instruction signal for setting a selected one of the engagement/release patterns and an instruction signal for executing the shift to the hydraulic control circuit C. In case the engagement/release pattern is to be changed prior to the execution of the shift, the output means 12 outputs an instruction signal for executing the shift after the change of the engagement/release pattern has been reliably executed. For this operation, the output means 12 is equipped with a timer 13.

A more specific example of the present invention will be described in the following.

In the example shown in FIG. 2, the gear train is composed mainly of three single-pinion type planetary gear sets 1, 2 and 3, the individual components of which are connected, as follows. The carrier 1C of the first planetary gear set 1 and the ring gear 3R of the third planetary gear set 3 are so connected to each other that they can revolve together, and the ring gear 2R of the second planetary gear set 2 and the carrier 3C of the third planetary gear set 3 are so connected to each other that they can revolve together. Moreover, the sun gear 1S of the first planetary gear set 1 is connected to the carrier 2C of the second planetary gear set 2 through second clutch means K2 and further to the sun gear 2S of the second planetary gear set 2 through fourth clutch means K4. The carrier 2C of the second planetary gear set 2 in turn is connected to the sun gear 3S of the third planetary gear set 3 through the fifth clutch means K5.

Incidentally, the individual components recited above can adopt such a connecting mechanism, e.g., a quill shaft, a solid shaft or a suitable connecting drum as is currently used in the existing automatic transmission.

An input shaft 4 is connected the (not-shown) engine through power transmission means such as a torque converter or a fluid coupling. Between this input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

Of the aforementioned first to fifth clutch means K1 to K5, the fourth clutch means K4 is composed of a one-way clutch 20 and a multiple disc clutch 22 which are disposed in parallel with each other. The other clutch means are composed of multiple disc clutches. Since the individual components are restricted in their arrangements for practical purposes, it is quite natural that suitable intermediate members such as connecting drums could be interposed as the connecting members for the individual clutch means K1, K2, K3, K4 and K5.

As brake means for stopping the rotation of the rotary components of the aforementioned planetary gear sets 1, 2 and 3, on the other hand, there are provided: first brake means B1 for stopping the rotation of the sun gear 3S of the third planetary gear set 3 selectively; second brake means B2 for stopping the rotation of the carrier 2C of the second planetary gear set 2 selectively; third brake means B3 for stopping the rotation of the sun gear 2S of the second planetary gear set 2 selectively; and fourth brake means B4 for stopping the rotation of the sun gear 1S of the first planetary gear set 1 selectively. Of these brake means, the first brake means B1 is composed of: a one-way clutch 40 which is interposed between the sun gear 3S of the third planetary gear set 3 and a transmission casing (as will be shortly referred to as the "casing") 6; and a band brake 42 disposed in parallel with the one-way clutch 40. On the other hand, the second brake means B2 is composed of a multiple disc brake whereas the third brake means B3 and the fourth brake means B4 are individually composed of band brakes. For practical purposes, it is quite natural that suitable connecting members could be interposed between those brake means B1, B2, B3 and B4 and either the individual components to be stopped by the brake means B1 to B4 or the casing 6.

Moreover, an output shaft 5 for transmitting the rotations to the propeller shaft or the counter gear (although neither of them are shown) is connected to the ring gear 2R of the second planetary gear set 2 and the carrier 3C of the thrid planetary gear set 3, which in turn are connected to each other.

Figure 2:
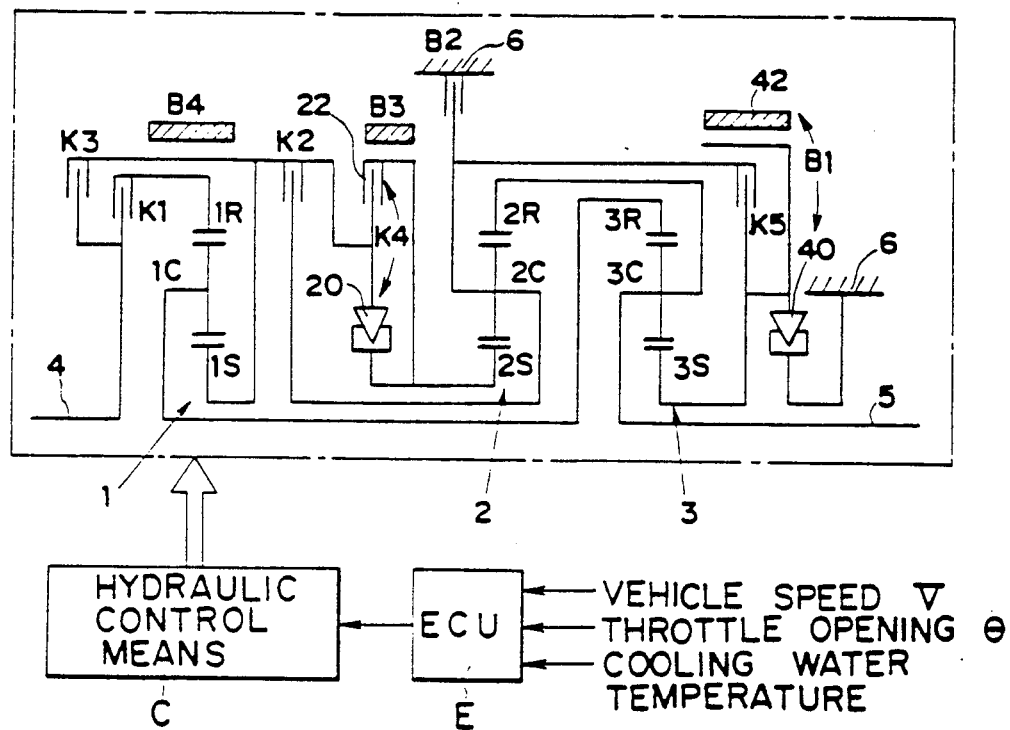
FIG. 2 is a skeleton diagram showing an automatic transmission according to an embodiment of the present invention.

Thus, the automatic transmission having the structure shown in FIG. 2 is enabled in principle to set forward ten and reverse one speed stages, which are composed of main forward five and reverse one speed stages by adding the so-called "2.2th, 2.5th and 2.7th speeds" between the forward 2nd and 3rd speeds and the so-called "3.2th and 3.5th speeds" between the forward 3rd and 4th speeds. Moreover, the speed stages other than the 2.2th, 2.7th, 3.2th and 3.5th speeds are set by a plurality of combinations (i.e., the so-called "engagement/release patterns") for engagement/release of the clutch means and the brake means for setting those speed stages are enumerated in the form of clutch and brake application chart in Table 1. Moreover, the load torques of the frictional engagement means in the individual engagement/release patterns are enumerated in Table 2 at ratios corresponding to the case in which the input torque is assumed to take a value of "1". In Table 1: symbols ○ indicate that the components are to be engaged; blanks indicate that the components are to be released; and symbols * indicate that the components may be engaged. Moreover, these symbols * indicate: such fifth clutch means K5 or first brake means B1 at the 1st speed that neither the gear ratio nor the revolving state is unchanged even if released; such first brake means B1 in the pattern of the column b at the 4th speed that not the gear ratio but the revolving state is changed if released; and such fourth clutch means K4 or third brake means B3 in the pattern of the column b of the 2nd speed that neither the gear ratio nor the revolving state is unchanged even if released if other means indicated at the symbols * are engaged. Still moreover, the columns indicated at a, b, c, — — —, and so on at the 2nd, 3rd, 4th and 5th speeds and the reverse stage and appearing in Tables 1 and 2 indicate such ones of the engagement/release patterns for setting the speed stages under consideration that the rotational speeds of the rotary components of the planetary gear sets are different. Furthermore, symbols ①, ②, ③, — — —, and so on indicate the kinds of the engagement/release patterns in which the rotary components of the planetary gear sets do not have different rotational speeds.

TABLE 1

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | * |  |  |
|  |  | ② | ○ |  |  | ○ | ○ | * | ○ |  |  |
|  |  | ③ | ○ |  |  | ○ | ○ |  | ○ |  |  |
| 2nd | a | ① | ○ | ○ |  | ○ |  | ○ | * |  | * |
|  |  | ② | ○ | ○ |  | ○ |  | * | ○ |  | * |
|  |  | ③ | ○ | ○ |  | ○ |  | * | * |  | ○ |
|  |  | ④ | ○ | ○ |  | * |  | ○ | * |  | ○ |
|  |  | ⑤ | ○ | ○ |  | * |  | * | ○ |  | ○ |
|  |  | ⑥ | ○ | ○ |  | * |  |  | ○ | ○ |  |
|  | b | ① | ○ |  |  | ○ | * | ○ |  | ○ | * |
|  |  | ② | ○ |  |  | ○ | * | * |  | ○ | ○ |
| 2.2th |  |  | ○ | ○ |  |  |  | ○ |  | * | * |
| 2.5th |  | ① | ○ | ○ |  |  |  | ○ |  | ○ | * |
|  |  | ② | ○ | ○ |  |  |  |  |  | ○ | ○ |
|  |  | ③ | ○ | ○ |  |  |  | * |  | ○ | ○ |
| 2.7th |  |  | ○ | ○ |  | ○ |  | * | ○ |  |  |
| 3rd | a | ① | ○ |  | ○ | ○ |  | ○ | * |  |  |
|  |  | ② | ○ |  | ○ | ○ |  | * | ○ |  |  |
|  | b |  | ○ |  | ○ | ○ |  | ○ |  | * |  |
|  | c |  | ○ |  | ○ | ○ |  | ○ |  |  |  |
|  | d |  | ○ |  | * | ○ |  | ○ |  |  |  |
| 3.2th |  |  | ○ |  | ○ |  |  |  |  | ○ |  |
| 3.5th |  |  | ○ | ○ | ○ |  |  |  |  | ○ |  |
| 4th | a | ① | ○ | * | ○ | ○ | ○ | * |  |  |  |
|  |  | ② | ○ |  | ○ | ○ | ○ |  |  |  |  |
|  |  | ③ | ○ | ○ | ○ | * | ○ |  |  |  |  |
|  |  | ④ | ○ | ○ | * | ○ | ○ |  |  |  |  |
|  | b |  | ○ |  | ○ | ○ | ○ | * |  |  |  |
| 5th | a |  |  | ○ | ○ | ○ | ○ | * |  |  |  |
|  | b |  | * | ○ | ○ | ○ |  |  |  | ○ |  |
|  | c |  |  | ○ | ○ | ○ |  | * |  | ○ |  |
| Rev | a | ① |  | ○ | ○ |  | ○ | * | * | ○ |  |
|  |  | ② |  | ○ | ○ |  | ○ | ○ | * |  |  |
|  | b |  | * |  | ○ | ○ |  |  |  |  | ○ |

TABLE 2

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | ① | 1.00 | | | 0.45 | 1.56 | 2.15 | * | | |
| | | ② | 1.00 | | | 0.45 | 0.59 | * | 2.15 | | |
| | | ③ | 1.00 | | | 0.45 | * | 0.59 | 1.56 | | |
| 2nd | a | ① | 1.00 | 0.45 | | | 0.45 | 1.04 | * | | * |
| | | ② | 1.00 | 0.45 | | | 0.59 | * | 1.04 | | * |
| | | ③ | 1.00 | 0.59 | | | 0.59 | * | * | | 1.04 |
| | | ④ | 1.00 | 0.45 | | | * | 0.59 | 0.45 | | * |
| | | ⑤ | 1.00 | * | | | * | 0.59 | * | | 0.45 |
| | | ⑥ | 1.00 | * | | | 0.59 | * | 0.59 | | 0.45 |
| | b | ① | 1.00 | | | 0.45 | | 0.59 | | 0.45 | * |
| | | ② | 1.00 | | | * | | 0.59 | | * | 0.45 |
| 2.2th | | | 1.00 | 0.45 | | | | 0.59 | | 0.13 | |
| 2.5th | | ① | 1.00 | | | 0.45 | 0.59 | | | 0.62 | * |
| | | ② | 1.00 | | | 0.17 | 0.59 | | | * | 0.62 |
| | | ③ | 1.00 | | | * | 0.59 | | | 0.17 | 0.45 |
| 2.7th | | | 1.00 | 0.63 | | 0.18 | | 0.59 | | | |
| 3rd | a | ① | 0.69 | | 0.31 | | * | 0.41 | * | | |
| | | ② | 0.69 | | 0.31 | | 0.41 | * | 0.41 | | |
| | b | | 0.69 | | 0.31 | | | 0.41 | * | | |
| | c | | 0.69 | | 0.31 | * | | 0.41 | | | |
| | d | | 0.69 | * | 0.31 | | | 0.41 | | | |
| 3.2th | | | 1.00 | 0.45 | | | 0.59 | | | 0.30 | |
| 3.5th | | | 0.69 | | 0.31 | | 0.41 | | | 0.12 | |
| 4th | a | ① | * | 1.41 | 1.00 | 0.41 | * | | | | |
| | | ② | 0.49 | 0.29 | 0.51 | * | 0.29 | | | | |
| | | ③ | 1.00 | 0.87 | * | 0.42 | 0.59 | | | | |
| | | ④ | 0.62 | * | 0.38 | 0.10 | 0.36 | | | | |
| | b | | | 1.41 | 1.00 | 0.41 | | * | | | |
| 5th | a | | | 1.00 | 1.00 | * | | | | 0.29 | |
| | b | | * | 1.00 | 1.00 | | | | | 0.29 | |
| | c | | | 1.00 | 1.00 | | | | | 0.29 | |
| Rev | a | ① | | | 1.00 | 1.00 | * | * | 3.47 | | |
| | | ② | | | 1.00 | 1.00 | 3.47 | 3.47 | * | | |
| | b | | * | | 1.00 | 1.00 | | | 3.47 | | |

Table 1 enumerates the shift stages which can be set in principle. For the practical purposes, a speed stage capable of establishing excellent power performance and accelerability is selected from those enumerated in Table 1. Specifically, the speed stages having the gear ratios in relations approximate to the geometric series are selected as the main ones, and the speed stages advantageous in the shift controllability and durability are selected from those of Table 1. In the example shown in FIG. 1, on the other hand, the fourth clutch means K4 and the first brake means B1 are individually equipped with the one-way clutches 20 and 40. As a result, the engagement of the fourth clutch means K4 is ordinarily maintained by the one-way clutch 20 to engage the multiple disc clutch 22 when the engine braking is necessary, if the relative rotations of the sun gear 1S of the first planetary gear set 1 and the sun gear 2S of the second planetary gear set 2 are directed to engage the one-way clutch 20. If, on the contrary, the relative rotations of the aforementioned two sun gears 1S and 2S are directed to release the one-way clutch 20, the multiple disc clutch 22 is engaged to bring the fourth clutch means K4 into the engaged state. These engagement relations are likewise applied to the first brake means B1. If the rotations of the sun gear 3S of the third planetary gear set 3 are directed to engage the one-way clutch 40, this clutch 40 is engaged to bring the first brake means B1 into the engaged state so that the multiple disc brake 42 is engaged when the engine braking is required. If, on the contrary, the rotations of the sun gear 3S of the third planetary gear set 3 are directed to release the one-way clutch 40, the multiple disc brake 42 is engaged to bring the first brake means B1 into the engaged state.

In the automatic transmission shown in FIG. 2, too, each of the speed stages shown in Table 1 is set, in the same manner of the prior art, in accordance with both the engine load represented by the throttle opening and the vehicle speed. The control means for this setting is exemplified by: the hydraulic control circuit C for supplying or relieving the oil pressures for engaging or releasing the aforementioned individual clutch means and brake means; and the electronic control unit (ECU) E for outputting electric instructions to the hydraulic control circuit C on the basis of its input data such as the vehicle speed V, the throttle opening θ, the shift position, the running mode select signal or the oil temperature.

For the speed stage having several kinds of engagement/release patterns, the control means including those hydraulic control circuit C and electronic control unit E selects different engagement/release patterns for the shifting operation and other operations and sets the corresponding speed stage.

This will be specifically described in the following. FIG. 3 is a flow chart showing one example of the controls to be executed in the aforementioned control means. First of all, the running conditions of the vehicle including the vehicle speed V, the throttle opening θ, the running mode select signal and the oil temperature are read (at Step 1). At subsequent Step 2, the shift pattern is read, and the routine then advances to Step 3, at which it is decided whether or not the running conditions should set the forward 1st speed. This decision result is "YES" if the vehicle starts to run forward. Accordingly, the pattern of 1st-@ appearing in Table 3 is selected as the first engagement/release pattern for setting the forward 1st speed so that the frictional engagement means determined by this engagement/release pattern, i.e., the first clutch means K1, the fourth clutch means K4, the fifth clutch means K5, the first brake means B1 and the second brake means B2 are engaged (at Step 4). The forward 1st speed can be set by engaging not only the first clutch means K1 and the fourth clutch means K4 but also any two of the fifth clutch means K5, the first brake means B1 and the second brake means B2. According to the aforementioned pattern of 1st-@, therefore, all the frictional engagement means to be engaged for setting the 1st speed are engaged. As a result, the torque is shared among the individual frictional engagement means engaged, so that the load torques to be applied to the individual clutch means and brake means are reduced, as added in Table 3.

When the running conditions are matured as the second pattern for setting the 2nd speed as the vehicle speed V is accelerated in the state of the 1st speed, the decision result of Step 3 is "NO", and the forward 2nd speed is decided at subsequent Step 5 to give the result "YES". In this case, a timer T1 is at first reset to zero (at Step 6). Then, the pattern ③ of the 1st speed of Table 1, i.e., the pattern for engaging the first clutch means K1, the fourth clutch means K4, the first brake means B1 and the second brake means B2 is outputted (at Step 7) to set the 1st speed. In order to set the 1st speed without fail according to the pattern ③, moreover the counted value of the timer T1 is decided (at Step 8), and the counting action is continued till a predetermined value α is exceeded. At the instant when the predetermined time (α) is elapsed, the pattern ① of the column b of Table 1 is outputted (at Step 9) as the engagement/release pattern for setting the 2nd speed. As a result, the shift from the 1st to 2nd speeds is achieved by releasing the second brake means B2 and by engaging the third brake means B3 so that the number of the frictional engagement means to have their engagement/release states is two.

In the aforementioned automatic transmission, therefore, the 1st speed is set for the shift to the 2nd speed in accordance with the engagement/release pattern advantageous for the shift. Before this, however, the frictional engagement means (i.e., the fifth clutch means K5 in the aforementioned example) to be repeated for the shift is engaged. As a result, the simultaneous shift can be avoided to facilitate the shift control. Since, moreover, the frictional engagement means have their individual load torques reduced except the instant of the shift, they can be small-sized.

Although the description thus far made is devoted to the engagement/release pattern for setting the 1st speed, the aforementioned automatic transmission is constructed to make controls like those thus far described, too, in case it is going to set another speed stage. Specifically, after the aforementioned Step 9, the engagement/release pattern for setting the 2nd speed is changed into the pattern @ of the column b of the 2nd speed of Table 3, to engage the fourth brake means B4 which has been released at the time of the shift from the 1st speed. If, in this state, a shift to the 3rd speed is decided, the pattern for setting the 2nd speed is temporarily changed into one advantageous for the shift to the 3rd speed. Then, the change (i.e., shift) from that pattern into one for setting the 3rd speed is executed. After this, the engagement/release patterns are likewise changed for the 3rd to 5th speeds.

Incidentally, the engagement/release patterns (as indicated by symbols @) to be set at the times other than the shifts at the individual speed stages are enumerated together with the load torques of the individual frictional engagement means in Table 3. Moreover, the torques indicated by symbols * in Table 3 are expressed by the following formulas, as adding the reference characters of the engagement means to the letter "T":

| | |
|---|---|
| *1: | $T_{B1} + T_{B2} = 2.15, T_{K5} = T_{B2}$; |
| *2a: | $T_{B1} + T_{B2} + T_{B4} = 1.04,$ |
| | $T_{K2} = 0.45 + T_{B4},$ |
| | $T_{K5} = 0.59 + T_{B1}$; |
| *2b: | $T_{B3} + T_{B4} = 0.45, T_{K5} = T_{B3}$; |
| *2.5: | $T_{B3} + T_{B4} = 0.45, T_{K4} = T_{B3}$; |
| *3a: | $T_{B1} + T_{B2} = 0.41, T_{K5} = T_{B2}$; |
| *4a: | $T_{K2} = 1.41 + 2.28 T_{K1},$ |
| | $T_{K3} = 1 + T_{K1},$ |
| | $T_{K4} = 0.23 T_{K1} + 0.41,$ |
| | $T_{K5} = 0.59 T_{K1}$; and |
| *Ra: | $T_{B1} + T_{B2} = 3.47, T_{K5} = T_{B1}$. |

TABLE 3

| | | | Clutch Means | | | | | Brake Means | | | |
|---|---|---|---|---|---|---|---|---|---|---|---|
| | | | K1 | K2 | K3 | K4 | K5 | B1 | B2 | B3 | B4 |
| 1st | | @ | ○ 1.00 | | | ○ 0.45 | ○ *1 | ○ *1 | ○ *1 | | |
| 2nd | a | @ | ○ 1.00 | ○ *2a | | | ○ *2a | ○ *2a | ○ *2a | | ○ *2a |
| | b | @ | ○ 1.00 | | | ○ *2b | | ○ 0.59 | | ○ *2b | ○ *2b |
| 2.5th | | @ | ○ 1.00 | | | ○ *2.5 | ○ 0.59 | | | ○ *2.5 | ○ *2.5 |
| 3rd | a | @ | ○ 0.69 | | ○ 0.31 | | ○ *3a | ○ *3a | ○ *3a | | |
| | b | @ | ○ 0.69 | | ○ 0.31 | | | ○ 0.41 | | ○ 0.00 | |
| | c | @ | ○ 0.69 | | ○ 0.31 | ○ 0.00 | | ○ 0.41 | | | |
| | d | @ | ○ 0.69 | ○ 0.00 | ○ 0.31 | | | ○ 0.41 | | | |
| 4th | a | @ | ○ *4a | ○ *4a | ○ *4a | ○ *4a | ○ *4a | | | | |
| | b | @ | | ○ 1.41 | ○ 1.00 | ○ 0.41 | | ○ 0.00 | | | |
| 5th | a | @ | | ○ 1.00 | ○ 1.00 | | ○ 0.00 | | | ○ 0.29 | |
| | b | @ | ○ 0.00 | ○ 1.00 | ○ 1.00 | | | | | ○ 0.29 | |
| | c | @ | | ○ 1.00 | ○ 1.00 | | | ○ 0.00 | | ○ 0.29 | |

TABLE 3-continued

|  |   |   | Clutch Means |  |  |  |  | Brake Means |  |  |  |
|---|---|---|---|---|---|---|---|---|---|---|---|
|  |   |   | K1 | K2 | K3 | K4 | K5 | B1 | B2 | B3 | B4 |
| Rev | a | @ |  |  | ○ 1.00 | ○ 1.00 | ○ *Ra | ○ *Ra | ○ *Ra |  |  |
|  | b | @ | ○ 0.00 |  | ○ 1.00 | ○ 1.00 |  |  | ○ 3.47 |  |  |

Figure 4:
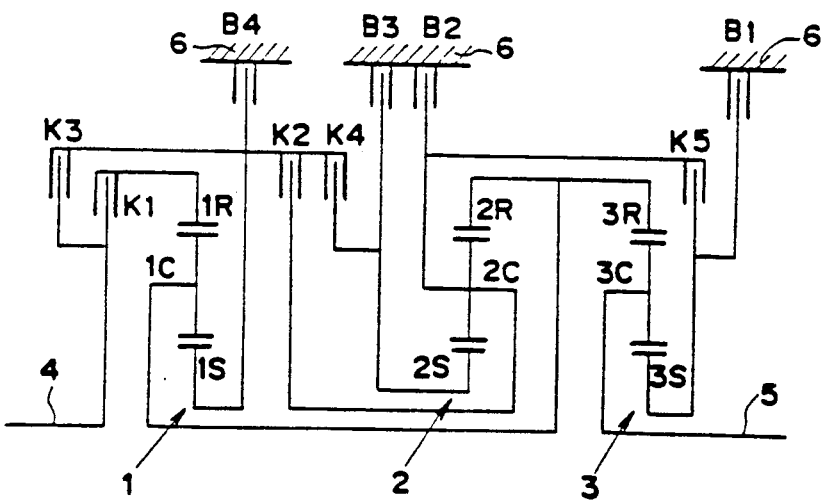
FIG. 4 is a skeleton diagram showing an example of the gear train.

The present invention should have its application not limited to the aforementioned structure shown in FIG. 2 but extended to an automatic transmission of another structure, as exemplified in FIG. 4. The structure, as shown in FIG. 4, is modified from that shown in FIG. 2 such that the connections of the rotary components of the gear train are partially changed. Specifically, the first to third planetary gear sets 1, 2 and 3 of single-pinion type are arrayed on a common axis between the input shaft 4 and the output shaft 5, which are arranged on the common axis. The ring gear 2R of the second planetary gear set 2 and the ring gear 3R of the third planetary gear set 3 are connected to each other and further to the carrier 1C of the first planetary gear set 1. Moreover, the clutch means are exemplified by: first clutch means K1 for connecting the input shaft 4 and the ring gear 1R of the first planetary gear set 1; second clutch means K2 for connecting the sun gear 1S of the first planetary gear set 1 and the carrier 2C of the second planetary gear set 2; third clutch means K3 for connecting the input shaft 4 and the sun gear 1S of the first planetary gear set 1; fourth clutch means K4 for connecting the sun gear 1S of the first planetary gear set 1 and the sun gear 2S of the second planetary gear set 2; and fifth clutch means K5 for connecting the carrier 2C of the second planetary gear set 2 and the sun gear 3S of the third planetary gear set 3. On the other hand, the brake means are exemplified by: first brake means B1 for stopping the sun gear 3S of the third planetary gear set 3; second brake means B2 for stopping the carrier 2C of the second planetary gear set 2; third brake means B3 for stopping the sun gear 2S of the second planetary gear set 2; and fourth brake means B4 for stopping the sun gear 1S of the first planetary gear set 1. Moreover, the output shaft 5 is connected to the carrier 3C of the third planetary gear set 3.

The automatic transmission, as shown in FIG. 4, can also establish a plurality of kinds of engagement/release patterns for a plurality of speed stages, as enumerated in Table 4:

TABLE 4

(Table 4 enumerates engagement/release patterns for speed stages 1st, 2nd (a, b), 2.2th, 2.5th, 3rd (a, b, c), 3.2th, 3.5th, 4th, 4.5th, 5th, and Rev using clutch means K1–K5 and brake means B1–B4, with ○ indicating engagement and * indicating engagement at times other than shifts.)

Thus, the automatic transmission having the structure shown in FIG. 4 is also enabled like the foregoing example to reduce the load torques to be applied to the individual frictional engagement means, without deteriorating the shift controllability, by engaging the frictional engagement means, as indicated by symbols * in Table 4, at the times other than a shift to set the individual speed stages. Moreover, such change of the engagement/release patterns and the accompanying shift controls are accomplished like the example shown in FIG. 2 by the electronic control unit and the hydraulic control circuit.

In FIG. 4, the individual frictional engagement means are so symbolically shown as to have the multiple disc structure, but any of them may be constructed like the structure shown in FIG. 2 to include a one-way clutch.

On the other hand, the description thus far made achieves the stepwise upshifts as an example. However, the present invention should not be limited to the foregoing embodiments but can be constructed to have different engagement/release patterns at the times of shifts and at other operations, too, in case of a jumping shift of two or more steps and a downshift. In the foregoing embodiments, moreover, the engagement/release patterns to be set for the shifts are conditioned to avoid the simultaneous shifts. Despite of this fact, however, the present invention should not be limited thereto but may be so conditioned to determine the engagement/release pattern that the fluctuating rotational speed of any rotary component may be reduced for the shift. Still moreover, the present invention may be constructed such that the controls for changing the engagement/release patterns for setting a predetermined speed stage at this speed stage may be effected only if the engine load is high (i.e., if the throttle opening θ is large).

Figure 5:
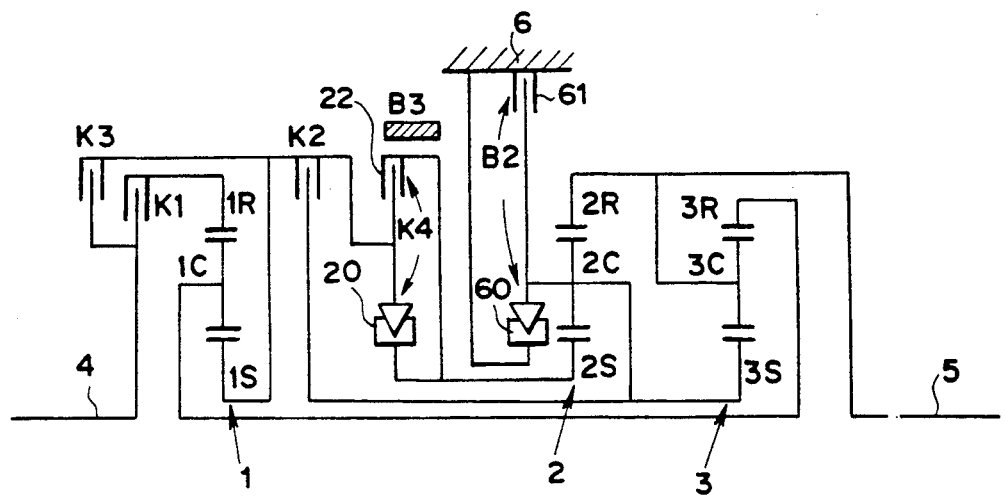
FIG. 5 is a skeleton diagram showing another example of the gear train.
Figure 6:
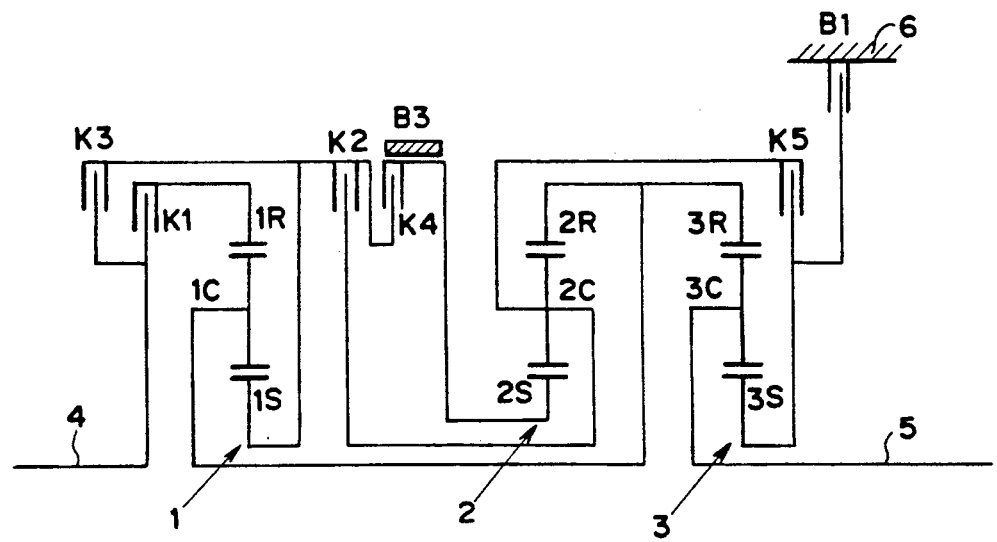
FIG. 6 is a skeleton diagram showing still another example of the gear train.

Other examples of the gear train, to which the present invention can be applied, are shown in FIGS. 5 and 6.

The example shown in FIG. 5 has a structure made similar to that of the gear train shown in FIG. 2, excepting that the fifth clutch means K5 is eliminated from the gear train of FIG. 2 to connect the carrier 2C of the secondary planetary gear set 2 and the sun gear 3S of the third planetary gear set 3 at all times, that the first brake means B1 and the fourth brake means B4 are eliminated, and that the second brake means B2 is composed of a multiple disc brake 61 and a one-way clutch 60 in a parallel relation to each other.

The automatic transmission having the gear train shown in FIG. 5 follows such a clutch and brake application chart as is modified from the foregoing Table 1 by blanking the column of the fifth clutch means K5 and filling up the column of the first brake means B1 or the fourth brake means B4 with symbols ◯.

As a result, the automatic transmission equipped with the gear train shown in FIG. 5 can set all the gear stages of Table 1 excepting the 2.2th and 2.7th speeds.

Moreover, the example shown in FIG. 6 has a structure made similar to that of the gear train shown in FIG. 4, excepting that the second brake means B2 and the fourth brake means B4 are eliminated, and that the third brake means B3 is composed of a band brake.

The automatic transmission having the gear train shown in FIG. 6 follows such a clutch and brake application chart as is modified from the foregoing Table 4 by either blanking the columns of the second brake means B2 and the fourth brake means B4 or filling up the same with symbols *.

As a result, the automatic transmission equipped with the gear train shown in FIG. 6 can set all the gear stages enumerated in Table 4.

On the other hand, the foregoing individual embodiments have been direction to the structure in which the gear train is constructed of the three single-pinion type planetary gear sets. Despite of this fact, however, the present invention can be applied to an automatic transmission in which the gear train is constructed of double-pinion type planetary gear sets. In short, the present invention can be applied to an automatic transmission having a plurality of kinds of engagement/release patterns for setting the individual speed stages, as are disclosed in our Japanese Patent Applications Nos. Hei 1-185151, Hei 1-185152, Hei 1-186991, Hei 1-186992, Hei 1-205478, Hei 1-280957 and so on.

In the automatic transmission of the present invention, as has been apparent from the description thus far made, even the frictional engagement means, which is released at the time of a shift even if it can be engaged for setting a predetermined speed stage, is engaged in the operations other than the shift. Thus, the torque is distributed and borne except the instant of the shift by as many frictional engagement means as possible. As a result, the load torques to be applied to the frictional engagement means can be reduced to lessen the capacities of the frictional engagement means so that the automatic transmission can reduce the size and lighten the weight in accordance with the present invention.

What is claimed is:

1. In an automatic transmission comprising: a plurality of frictional engagement means; and a gear train adapted to set a plurality of speed stages having different gear ratios in accordance with combinations for engagement/release of said frictional engagement means, wherein at least one of said speed stages is capable of being set by plural ones of said combinations, a shift control system comprising:
decision means for deciding a shift to be executed from said at least one of said speed stages;
engagement/release pattern selecting means for selecting a first combination of said frictional engagement means for setting said at least one of said speed stages, before the shift is decided, and a second combination for setting said at least one of said speed stages if the shift is decided; and
output means for outputting both an instruction signal for executing the shift and an instruction signal for setting the second combination.

2. A shift control system according to claim 1, wherein said decision means comprises means for deciding a speed stage to be set on the basis of a vehicle speed and an engine load.

3. A shift control system according to claim 1, wherein said engagement/release pattern selecting means comprises means to select as said second combination, such one of the combinations for engagement/release of said frictional engagement means that the number of frictional engagement means to have their engagement/release states switched at the time of the shift execution is two or less.

4. A shift control system according to claim 1, wherein said output means comprises a timer for counting a predetermined time period from an instant when the second combination is outputted to an instant when the instruction signal for the shift execution is outputted.

5. A shift control system according to claim 1, wherein said gear train comprises:
an input shaft;
an output shaft;
a first planetary gear set comprising a first sun gear, a first ring gear, a pinion gear meshing with said first sun gear and said first ring gear, and a first carrier supporting said pinion gear;
a second planetary gear set comprising a second sun gear connected to said first sun gear, a second ring gear, a pinion gear meshing with said second sun gear and said second ring gear, and a second carrier supporting said pinion gear; and
a third planetary gear set comprising a third sun gear connected to said second carrier; a third ring gear connected to said first carrier, a pinion gear meshing with said third sun gear and said third ring gear, and a third carrier supporting said pinion gear and connected to said second ring gear.

6. A shift control system according to claim 5, wherein said frictional engagement means comprises:
first clutch means for connecting said input shaft and said first ring gear selectively;
second clutch means for connecting said first sun gear and said second carrier selectively;
third clutch means for connecting said input shaft and said first sun gear selectively;
fourth clutch means for connecting said first sun gear and said second sun gear selectively;
first brake means for stopping the rotation of said second carrier selectively; and
second brake means for stopping the rotation of said second sun gear selectively, and
wherein said output shaft is connected to said second ring gear or said third carrier.

7. A shift control system according to claim 6, wherein said fourth clutch means comprises a one-way clutch and a multiple disc clutch in parallel relation to each other,
wherein said first brake means comprises a multiple disc brake and a one-way clutch in parallel relation to each other, and
wherein said second brake means comprises a band brake.

8. A shift control system according to claim 1, wherein said gear train comprises:
- an input shaft;
- an output shaft;
- a first planetary gear set comprising a first sun gear, a first ring gear, a pinion gear meshing with said first sun gear and said first ring gear, and a first carrier supporting said pinion gear;
- a second planetary gear set comprising a second sun gear connected to said first sun gear, a second ring gear connected to said first carrier, a pinion gear meshing with said second sun gear and said second ring gear, and a second carrier supporting said pinion gear; and
- a third planetary gear set comprising a third sun gear connected to said second carrier, a third ring gear connected to said second ring gear, a pinion gear meshing with said third sun gear and said third ring gear, and a third carrier supporting said pinion gear.

9. A shift control system according to claim 8, wherein said frictional engagement means comprises:
- first clutch means for connecting said input shaft and said first ring gear selectively;
- second clutch means for connecting said first sun gear and said second carrier selectively;
- third clutch means for connecting said input shaft and said first sun gear selectively;
- fourth clutch means for connecting said input shaft and said second sun gear selectively;
- fifth clutch means for connecting said second carrier and said third sun gear selectively;
- second brake means for stopping the rotation of said second sun gear selectively; and
- third brake means for stopping the rotation of said third sun gear selectively, and wherein said output shaft is connected to said third carrier.

10. A shift control system according to claim 9, wherein said second brake means comprises a band brake.

11. In an automatic transmission comprising: a plurality of frictional engagement means; and a gear train adapted to set a plurality of speed stages having different gear ratios in accordance with combinations for engagement/release of said frictional engagement means, wherein at least one of said speed stages is capable of being set by plural ones of said combinations, a shift control method comprising:
- a first step of deciding a shift to be executed from said at least one of said speed stages;
- a second step of selecting a first combination of said frictional engagement means for setting the at least one of said speed stages, before the shift is decided, and a second combination for setting said at least one of said speed stages if the shift is decided;
- a third step of changing said first combination to said second combination in case the shift to be executed is decided; and
- a fourth step of executing the shift after said second combination has been set.

12. A shift control method according to claim 11, wherein the decision of said first step is executed on the basis of a vehicle speed and an engine load.

13. A shift control method according to claim 11, wherein said second combination is selected such that the number of the frictional engagement means to have their engagement/release states at the time of the shift execution is two or less.

14. A shift control method according to claim 11, wherein said fourth step is executed after counting a predetermined time by means of a timer.

* * * * *